Dec. 11, 1923.                                                    1,476,758
W. LA HODNY
BRACKET FOR SUPPORTING MIRRORS, GLASS PLATES, AND THE LIKE
Filed Jan. 24, 1920
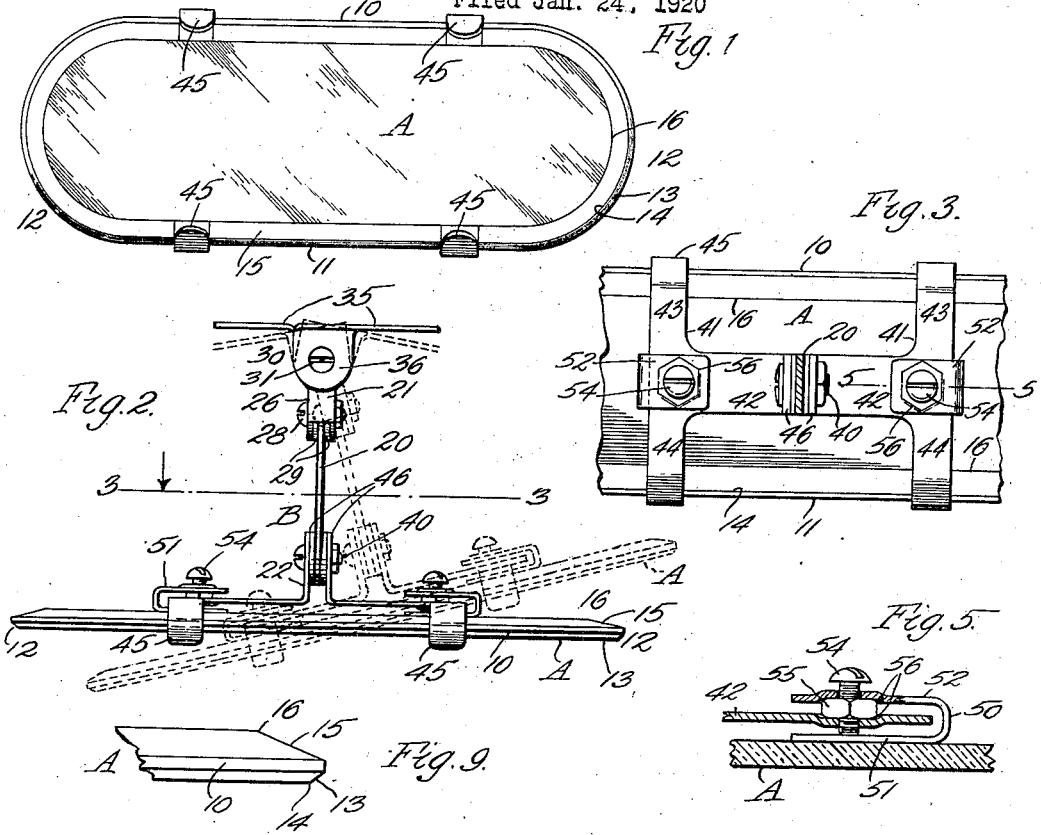
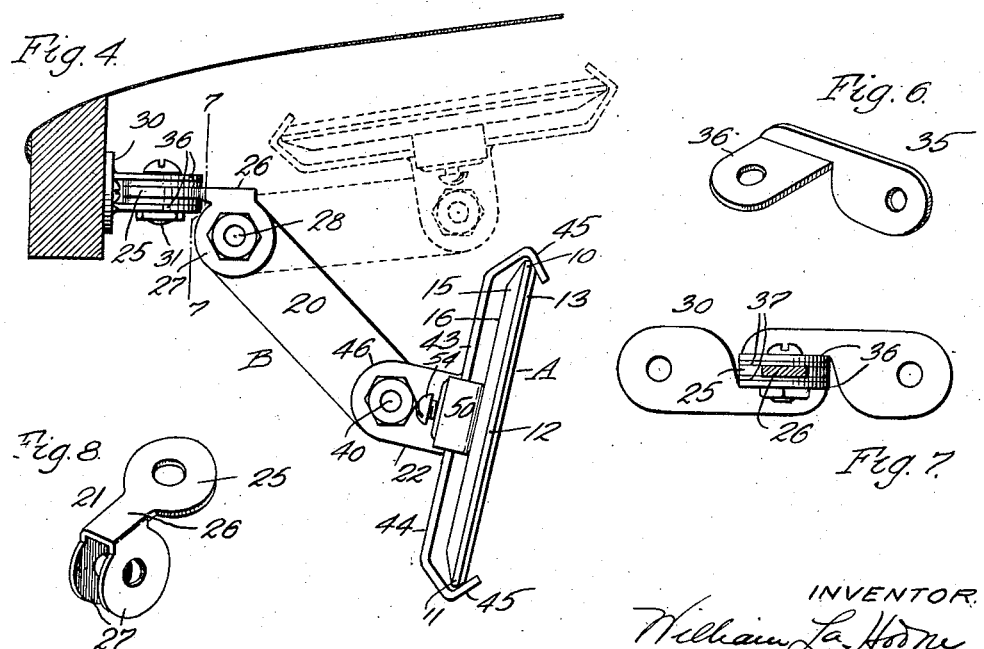
INVENTOR.
William La Hodny
By Parker Burchard
ATTORNEYS.

Patented Dec. 11, 1923.

1,476,758

UNITED STATES PATENT OFFICE.

WILLIAM LA HODNY, OF BUFFALO, NEW YORK.

BRACKET FOR SUPPORTING MIRRORS, GLASS PLATES, AND THE LIKE.

Application filed January 24, 1920. Serial No. 353,653.

*To all whom it may concern:*

Be it known that I, WILLIAM LA HODNY, a citizen of the United States, residing at Buffalo, in the county of Erie and State of New York, have invented a new and useful Improvement in Brackets for Supporting Mirrors, Glass Plates, and the like, of which the following is a specification.

This invention relates to improvements in brackets for supporting mirrors, of the sort used on automobiles and other vehicles, in a position to enable the driver to readily see vehicles or objects in rear of his vehicle.

The objects are to provide a bracket or support for the mirror of novel construction adapting the mirror to be readily inserted and securely fastened in and removed therefrom without marring or injuring the silvered backing of the mirror; to provide adjustable means on the support which will cooperate with the finished edges of the mirror to securely grip and retain the mirror thereon; to construct the support so that it may be mounted on the front bar or part of the top of a vehicle and which is adjustable to different horizontal and vertical positions to properly reflect objects in the rear so that the driver may have a clear view without changing his position in the vehicle, also so that it may be folded up out of the way between the front and the under surface of the top or roof of the vehicle; and also to improve the mirror support or bracket in other respects hereinafter set forth and claimed.

In the drawings:

Fig. 1 is a front elevation of a mirror and its supporting means constructed in accordance with this invention.

Fig. 2 is a plan view thereof, showing by full and broken lines respectively, two different operative positions of the device.

Fig. 3 is a fragmentary rear sectional elevation of the device on line 3—3 Fig. 2.

Fig. 4 is a side elevation of the device, showing the same in an operative position on a vehicle top, and showing in dotted lines another adjusted position thereof.

Fig. 5 is a fragmentary sectional plan view, on an enlarged scale on line 5—5 Fig. 3 of the means for yieldingly retaining the mirror on the bracket.

Fig. 6 is a perspective view of one of the elements comprising the inner securing member of the device.

Fig. 7 is a fragmentary sectional elevation on line 7—7 Fig. 4.

Fig. 8 is a perspective view of the inner section of the support.

Fig. 9 is a fragmentary enlarged transverse section of the mirror or reflector.

A reflecting device for use in connection with this invention is disclosed in the drawings and preferably comprises a glass mirror A and an adjustable supporting bracket B on which it is removably secured and by which it is adjustably supported on the front part of a vehicle facing the driver so as to reflect towards him a view of the surroundings at the back of the vehicle, preferably as seen through a rear window of the vehicle, thus indicating the presence and direction of travel of other vehicles.

The mirror A may be of any suitable or desired outline, that shown in the drawings having upper and lower parallel side edges 10, 11 and curved or rounded opposite end edges 12. These edges 10, 11 and 12 are finished in a novel manner to produce a framed effect as follows: The corners formed by the meeting of the front surface of the mirror and the edges 10, 11 and 12 are ground off to form a short bevel 13, the inner edge of which is indicated at 14, while the corners formed by the meeting of the rear surface and the edges of the mirror body are ground off to form a wider border or bevel 15, the inner edge of which is shown at 16. The back surface of the mirror body is silvered in the usual way to give a reflecting field or surface, but this silvered surface is confined within the edges 16 of the rear bevel 15, and consequently the unsilvered border 15 is transparent or non-reflecting and gives the mirror an appearance of being framed when viewed from the front. Another important result of this construction is that the border 15 is non-reflecting and therefore no confusing or distracting double images are reflected from the mirror when in use.

The adjustable bracket or support B for the mirror A preferably comprises an intermediate section 20 and inner and outer sections 21, 22 respectively, pivotally connected to the opposite ends of the intermediate section 20 so that the sections may swing to different angular relations to each other in the same planes. The inner section 21 is preferably formed of a single sheet metal stamping having a horizontal disk portion 25 from which extends an outwardly projecting arm 26 provided with a pair of depending ears 27 at its opposite edges which are adapted to embrace the adjacent end of the intermediate section 20. The section 20 is formed of a flat metal plate or stamping arranged on edge and the inner section 21 is pivotally secured to one end thereof as by a horizontal pivot or bolt 28 passing through registering holes in the section 20 and the depending ears 27 of the inner section. Suitable friction disks 29 are preferably disposed between the opposite faces of the end of the section 20 and the ears 27 so that when the bolt 28 is tightened the necessary friction will be provided to securely hold the sections in their adjusted positions.

The inner section 21 is preferably pivotally connected to a securing member 30 by a vertical pivot 31. This securing member is adapted to be fastened in any suitable manner to the vehicle to support the device in operative position. It comprises right and left hand sections or pieces 35, each of which is formed of a single sheet metal stamping having a vertically disposed, relatively wide back part in which a hole is provided for a screw or the like to secure it to the support, and which has extending forwardly therefrom a horizontal bearing jaw 36 having a hole for a vertical pivot 31. In assembling, the two sections of the securing member are arranged as shown with the bearing jaws 36 one below and one above the disk portion 25 of the inner section with interposed friction disks 37, and the pivot bolt 31 is inserted through the alined holes and tightened up. A securing member constructed in this manner can be made up with the minimum waste of metal, and the separate bracket pieces 35 may move in a horizontal plane relative to each other so that they may be alined and secured to an irregular or uneven surface if necessary.

The outer section 22 is pivotally secured to the intermediate section 20 by a horizontal bolt or pivot 40 in a similar manner to the pivot 28. This outer section 22 preferably comprises two oppositely arranged holding members each of which is formed of a sheet metal stamping 41, on which is provided an adjustable clamp adapted to engage the back of the mirror and cooperate with hooks or fingers on the holding member, which fingers engage opposite edges of the mirror. Each of the holding members 41 is provided with a laterally extending horizontal arm 42 arranged adjacent and parallel to the back of the mirror and the outer end of which has oppositely directed vertical finger pieces 43, 44, the outer ends of which are formed with suitably shaped hooks 45 which fit over and engage the upper and lower edges 10 and 11 of the mirror. The inner or adjacent ends of the arms 42 have rearwardly extending jaws 46 which embrace the outer end of the intermediate section 20 and have registering holes through which the pivot 40 extends. Friction disks are preferably used in this pivotal connection, as in those before described. The extremity of each of the hooks 45 is adapted to extend inwardly over an edge of the mirror or towards the hook at the opposite edge thereof. The adjustable clamps before mentioned are adapted to engage the back of the mirror adjacent the outer ends of the retaining members and press the top and bottom beveled edge 13 of the mirror into firm contact with the extremities of the hooks. Each clamp comprises a bent or U-shaped metal strip 50, the front and rear legs 51 and 52 of which straddle the outer end of the retaining members. The leg 51 is adapted to rest against the rear or silvered back of the mirror and a tightening screw or bolt 54, passes through an aperture in the other leg thence through a threaded nut 55 and through a threaded hole in the holding member. The nut 55 is prevented from turning by seating the front and rear sides of the same in depressions or recesses 56 in the adjacent faces of the leg 52 and the holding member and by turning the screw 54 the leg 51 will be forced away from the holding member and will press the glass firmly against the hooks 45. Any other suitable adjusting means may be employed to firmly hold the edges of the mirror in engagement with the retaining members.

By making the mirror with unsilvered edges, and providing the clamp 50 with the wide flat bearing surface engaging the silvered back of the mirror the mirror may be freely inserted or removed from the support without injury to the silvered backing. The relative movements permitted between the sections of the supporting bracket or device enables the driver to adjust the mirror to the proper lateral and vertical inclination or to fold the device up under the top or roof of the vehicle when not in use.

The rear bevel 15 being unsilvered preserves the desired frame effect as the hooks 45 do not come in contact with the silvered back and the insertion and removal of the mirror into and out of the supporting device may be accomplished without scraping or marring the edge of the silvered surface. The back parts of the hooks are preferably entirely out of contact with the bevel 15 and so will not scratch the polished surface thereof or reduce its brilliancy.

I claim as my invention:

1. A bracket for supporting a glass-plate comprising an arm adapted to be arranged in rear of the plate and having a part overhanging the front side of the same, a U-shaped clamp having its front leg adapted to be arranged between said arm and the plate and to engage the rear side of the latter and having its rear leg arranged in rear of said arm, and a tightening member bearing against said front leg and mounted on said rear leg.

2. A bracket for supporting a glass-plate comprising an arm adapted to be arranged in rear of the plate and having a threaded hole and a hook adapted to engage the edge of the plate and overhang the front side of the same, a U-shaped clamp having front and rear legs arranged in front and in rear of said arm and said front leg adapted to bear against the rear side of the plate and said rear leg having an opening in line with the threaded opening in said arm, and a tightening screw working with its central part in the threaded opening of said arm while its outer part passes through the opening in said outer leg and its inner end is adapted to engage with the rear side of said front leg and press the same against the rear side of said plate.

3. A bracket for supporting a glass-plate comprising an arm adapted to be arranged in rear of the plate and having a threaded hole and a hook adapted to engage the edge of the plate and overhang the front side of the same, a U-shaped clamp having front and rear legs arranged in front and in rear of said arm and said front leg adapted to bear against the rear side of the plate and said rear leg having an opening in line with the threaded opening in said arm, a tightening screw working wtih its central part in the threaded opening of said arm while its outer part passes through the opening in said outer leg and its inner end is adapted to engage with the rear side of said front leg and press the same against the rear side of said plate, and a screw nut arranged on said screw between said arm and rear leg.

4. A bracket for supporting a glass-plate comprising an arm adapted to be arranged in rear of the plate and having a threaded hole and a hook adapted to engage the edge of the plate and overhang the front side of the same, a U-shaped clamp having front and rear legs arranged in front and in rear of said arm and said front leg adapted to bear against the rear side of the plate and said rear leg having an opening in line with the threaded opening in said arm, a tightening screw working with its central part in the threaded opening of said arm while its outer part passes through the opening in said outer leg and its inner end is adapted to engage with the rear side of said front leg and press the same against the rear side of said plate, and a screw nut arranged on said screw between said arm and rear leg, the opposing rear side of said arm and the front side of said rear leg being provided with depressions in which the front and rear sides of said nut are seated.

Witness my hand this 22nd day of January, 1920.

WILLIAM LAHODNY.

Witnesses:
HELEN SCHNEIDER,
ROBERT F. LABRESS.